UNITED STATES PATENT OFFICE.

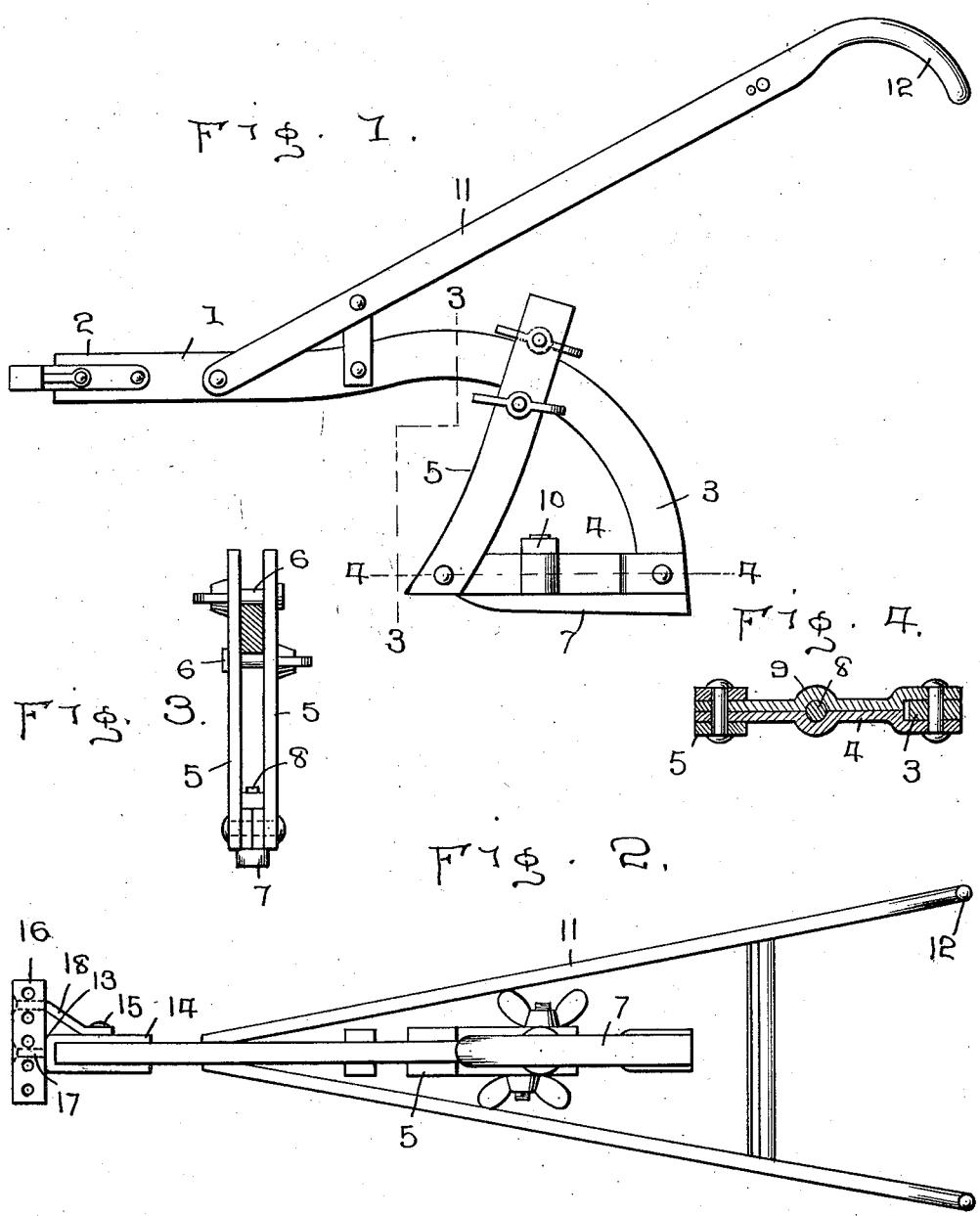

CHARLES H. KELLEY, OF HARTSVILLE, SOUTH CAROLINA.

PLOW.

1,008,918.      Specification of Letters Patent.      Patented Nov. 14, 1911.

Application filed January 17, 1911. Serial No. 603,113.

*To all whom it may concern:*

Be it known that I, CHARLES H. KELLEY, a citizen of the United States, residing at Hartsville, in the county of Darlington and State of South Carolina, have invented certain new and useful Improvements in Plows; and I do hereby declare the following to be a full, clear, and exact description of the invention, such as will enable others skilled in the art to which it appertains to make and use the same.

My invention relates to new and useful improvements in plows and more particularly to plow frames and the object of my invention is to provide a plow frame which may be readily adjusted to incline the plowshare to different angles to the surface of the earth.

A further object of my invention is to provide a plow frame which is of very simple construction and which will be very durable in use.

A still further object of my invention is to so construct the plow frame that the parts thereof may be readily replaced when worn or broken.

Other objects and advantages will be hereinafter set forth and pointed out in the specification.

In the accompanying drawings which are made a part of this application, Figure 1 is a side elevation of the complete plow frame. Fig. 2 is a bottom plan view thereof. Fig. 3 is a vertical sectional view through a portion of the plow frame as seen on line 3—3, Fig. 1, and, Fig. 4 is a longitudinal sectional view through a portion of the plow frame as seen on line 4—4, Fig. 1.

Referring to the drawings in which similar reference numerals designate corresponding parts throughout the several views, 1 is the beam of my plow frame which comprises a forward horizontal portion 2 and a downwardly and rearwardly curved portion 3, to the lower end of which is pivotally secured a pair of supporting bars or links 4. To the forward end of the bars 4 is pivotally secured a pair of supporting bars 5, which extend upwardly and beyond the curved portion 3 of the beam of the plow. The supporting bars 5 are adapted to have clamped thereto a suitable form of plowshare. Extending through the bars 5 above and beneath the beam 3 is a pair of bolts 6, which are preferably provided with wing nuts at one end. The bolts 6 are adapted to clamp the bars 5 against the beam 3 in desired position.

In use the bars 4 would be quickly worn out unless properly protected, and in order to protect the same I provide a removable shoe 7, which is provided with an upwardly extending bolt member 8. The bars 4 are provided with a socket portion 9 intermediate their ends, through which the bolt 8 is adapted to take and said bolt is secured in place by any preferred means, such as a nut 10.

Secured to the portion 2 of the beam and extending rearwardly and upwardly therefrom is a pair of bars 11, which are provided at their outer ends with handles 12, by means of which the plow may be guided.

The forward end of the beam 1 is provided with an adjustable clevis 13, by means of which the line of draft upon the plow may be changed. The clevis 13 comprises a preferably U-shaped member 14, which is adapted to be secured to the beam of the plow by means of a bolt 15. The bar 16 of the clevis is provided with a plurality of apertures, in which draft appliances may be secured and the bar is off-set in relation to the member 14 and is secured thereto by means of a screw or bolt 17 and a bracket 18. The bolt 17 extends through the bar 16 near one end and is secured to the supporting member 14, while the end of the bracket 18 extends through the opposite end of the bar 16 and is then bent toward the opposite end of the bar 16 and is secured to the supporting member 14 and to the plow beam by means of the bolt 15.

In use it is often necessary to have the draft animal walk to one side or the other of the line of travel of the plow and with the ordinary construction this result is only accomplished by the operator holding the plow in a direction to cause it to move to one side of the draft animal. With the construction shown, the line of draft may be readily changed to either side of the line of travel of the plow. As shown in the drawing, the curved bar is adjusted upon the left side of the plow beams so that the draft animal could be positioned to the left side of the line of travel of the plow. If it is desired to have the animal move upon the opposite side of the plow, it would only be necessary to remove the bolt 15 and reverse the clevis 13. The same results cannot be secured, with the ordinary construction of plow, when used in varying kinds of soil, as the plow would cut differently through a soft or smooth soil than it would through a hard or rough soil.

More nearly uniform results are obtained with my construction than with the ordinary form of plow as the plowshare may be inclined to the surface of the soil at varying degrees, it only being necessary to loosen the bolts 6, when the bars 5 can be moved to any desired inclination and the bolts re-tightened.

In practice I desire to use thumb nuts in coöperation with the bolts 6, as in using this form of nut the same may be more readily loosened.

It will clearly be seen that I have provided a plow which may be readily adapted to use in varying kinds of soil. It will further be seen that the parts of my plow are of simple construction and may readily be renewed when worn or broken, and, it will further be seen that the line of draft upon the plow can readily be changed when desired.

What I claim is:

A plow comprising a beam having a downwardly and rearwardly extending end, bars pivotally connected to said downwardly extending portion on either side thereof, said bars provided intermediate their ends with a socket, a share supporting device pivotally secured to the forward end of said bars and adjustably connected to said beam, a shoe extending longitudinally of said bars, and means engaging said socket for securing said shoe to said bars.

In testimony whereof I have signed my name to this specification in the presence of two subscribing witnesses.

CHAS. H. KELLEY.

Witnesses:
  F. A. MILLER,
  JESS HULL.

---

Copies of this patent may be obtained for five cents each, by addressing the "Commissioner of Patents, Washington, D. C."